(12) United States Patent
Franciosi et al.

(10) Patent No.: US 12,443,426 B2
(45) Date of Patent: Oct. 14, 2025

(54) TECHNIQUES FOR SWITCHING DEVICE IMPLEMENTATIONS FOR VIRTUAL DEVICES

(71) Applicant: NUTANIX, INC., San Jose, CA (US)

(72) Inventors: Felipe Franciosi, Cambridge (GB); John Levon, Manchester (GB)

(73) Assignee: NUTANIX, INC., San Jose, CA (US)

( * ) Notice: Subject to any disclaimer, the term of this patent is extended or adjusted under 35 U.S.C. 154(b) by 489 days.

(21) Appl. No.: 17/544,128

(22) Filed: Dec. 7, 2021

(65) Prior Publication Data

US 2023/0176884 A1 Jun. 8, 2023

(51) Int. Cl.
*G06F 9/455* (2018.01)
*G06F 9/48* (2006.01)
*G06F 9/54* (2006.01)
*G06F 12/02* (2006.01)

(52) U.S. Cl.
CPC ........ *G06F 9/45558* (2013.01); *G06F 9/4812* (2013.01); *G06F 9/542* (2013.01); *G06F 12/0238* (2013.01); *G06F 2009/45583* (2013.01); *G06F 2009/45595* (2013.01)

(58) Field of Classification Search
CPC .... G06F 9/45558; G06F 9/4812; G06F 9/542; G06F 12/0238; G06F 2009/45583; G06F 2009/45595; G06F 9/5077; G06F 2009/45579
See application file for complete search history.

(56) References Cited

U.S. PATENT DOCUMENTS

| | | |
|---|---|---|
| 7,620,984 B2 | 11/2009 | Kallahalla et al. |
| 7,793,279 B1 | 9/2010 | Le et al. |
| 8,327,358 B2 | 12/2012 | Mangione-Smith |
| 8,549,518 B1 | 10/2013 | Aron et al. |
| 8,601,473 B1 | 12/2013 | Aron et al. |
| 8,825,909 B1 | 9/2014 | Delco |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |

(Continued)

FOREIGN PATENT DOCUMENTS

| | | |
|---|---|---|
| CN | 1971509 A | 5/2007 |
| TW | 2013027398 A | 7/2013 |

OTHER PUBLICATIONS

VFIO—"Virtual Function I/O" [1], https://www.kernel.org/doc/html/latest/driver-api/vfio.html, 10 pages.

(Continued)

*Primary Examiner* — Sisley N Kim
(74) *Attorney, Agent, or Firm* — Artegis Law Group, LLP

(57) ABSTRACT

Various embodiments set forth techniques for managing devices in a virtual environment. The techniques include mapping a virtual device of a virtual computing instance to a first device implementation. The techniques further include, in response to a trigger condition, remapping the virtual device to a second device implementation. The remapping is transparent to the virtual computing instance.

30 Claims, 10 Drawing Sheets

(56) References Cited

U.S. PATENT DOCUMENTS

| | | | |
|---|---|---|---|
| 9,772,866 | B1 | 9/2017 | Aron et al. |
| 10,552,194 | B2 | 2/2020 | Hoppert |
| 2015/0058838 | A1* | 2/2015 | Tsirkin ................ G06F 9/4862 718/1 |
| 2015/0317088 | A1* | 11/2015 | Hussain ............... G06F 3/0688 711/103 |
| 2015/0347166 | A1* | 12/2015 | Noel .................... G06F 9/4856 718/1 |
| 2017/0097842 | A1 | 4/2017 | Bugenhagen |
| 2018/0046483 | A1* | 2/2018 | Tsirkin ................ G06F 9/45558 |
| 2020/0167247 | A1* | 5/2020 | Tsirkin ................ G06F 11/1484 |
| 2023/0153140 | A1* | 5/2023 | Pfefferle ............. G06F 9/45558 718/1 |

OTHER PUBLICATIONS

LeVasseur et al., "Unmodified Device Driver Reuse and Improved System Dependability via Virtual Machines", 14 pages.

Menon et al., "TwinDrivers: Semi-Automatic Derivation of Fast and Safe Hypervisor Network Drivers from Guest OS Drivers", 12 pages.

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

\* cited by examiner

TECHNIQUES FOR SWITCHING DEVICE IMPLEMENTATIONS FOR VIRTUAL DEVICES

TECHNICAL FIELD

The contemplated embodiments relate generally to virtualization and computer science and, more specifically, to switching virtual computing instance device implementations for virtual devices.

BACKGROUND

A virtual machine (VM) is a virtualization of a computing system. A VM can implement a virtual hardware platform that supports the installation of a guest operating system (OS) on which applications execute. The physical hardware on which a VM executes is referred to as a host computer, or a "node." Oftentimes, VMs are placed across multiple nodes in a "cluster" of nodes. Each node can execute multiple VMs that share physical resources of the node.

A virtual device that is included in the virtual hardware of a VM can be implemented in various ways. For example, the virtual device could be implemented according to a pass-through model in which device accesses are communicated directly to a physical device that supports the virtual device, without being translated by a virtualization layer. As another example, the virtual device could be implemented as an emulated device in which device accesses are made to the system memory of a node, rather than to a physical device.

No conventional techniques exist for switching between device implementations for the virtual device of a VM in a manner that is not visible to the VM as such switching is typically controlled by the VM or end user. Consider the case of a VM that is being moved, or "migrated," from a source node to a destination node. As a general matter, the VM can be migrated without being aware of the migration. However, if the destination node does not include a physical device that can support a virtual device of the VM, then the device implementation for that virtual device would need to be switched to an emulated implementation at the destination node. Further, such a switch cannot be achieved using conventional techniques without the VM being aware of the switch.

Accordingly, there is a need for improved techniques for managing devices in virtual environments.

SUMMARY

Various embodiments of the present disclosure set forth one or more non-transitory computer-readable media storing program instructions that, when executed by one or more processors, cause the one or more processors to perform steps. The steps include mapping a virtual device of a virtual computing instance to a first device implementation. The steps further include, in response to a trigger condition, remapping the virtual device to a second device implementation, where the remapping is transparent to the virtual computing instance.

Other embodiments include, without limitation, systems that implement one or more aspects of the disclosed techniques, and methods for performing one or more aspects of the disclosed techniques.

At least one technical advantage of the disclosed techniques relative to the prior art is that the disclosed techniques permit switching between device implementations for a virtual device in a manner that is transparent to a virtual computing instance associated with the virtual device. A hardware implementation can be used when a physical device is available, and a switch can be made to a software implementation when the physical device becomes unavailable, such as when the virtual computing instance is migrated to another node that does include the physical device. In addition, a switch between a hardware implementation and a software implementation can be made based on resource utilization of a physical device that provides the hardware implementation. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
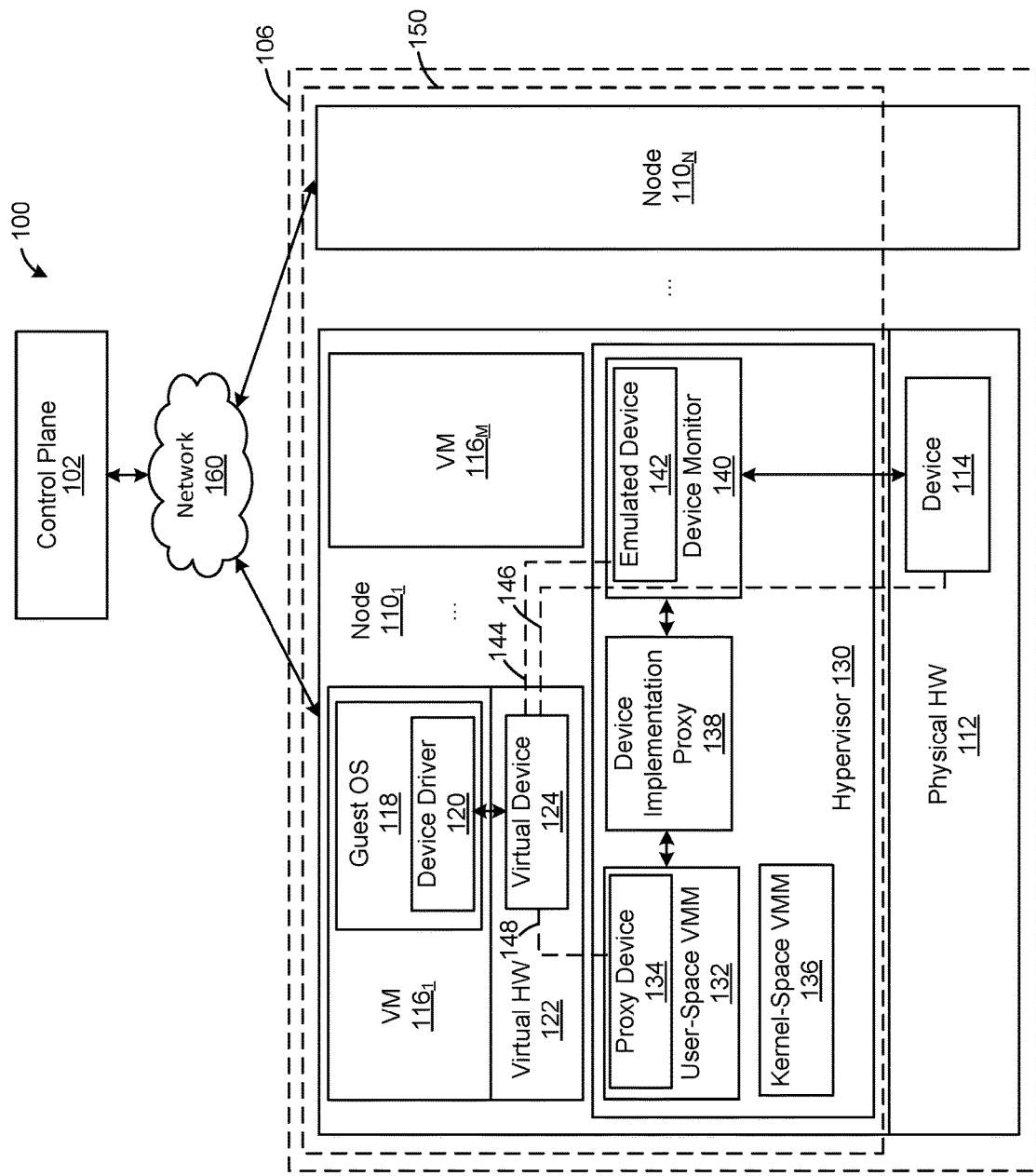
FIG. 1 is a conceptual illustration of a system that is configured to implement one or more aspect of the various embodiments.

FIG. 1 is a conceptual illustration of a system 100 that is configured to implement one or more aspect of the various embodiments. As shown, system 100 includes one or more nodes $110_{1-N}$ (referred to herein individually as a node 110 and collectively as nodes 110) on which a virtualized infrastructure 150 is implemented. Each node 110 can include any technically feasible computing system, such as a server computing system. The physical hardware of each node 110 can include, without limitation, one or more central processing units (CPUs), system memory, a network interface, graphics processing units (GPUs), storage devices, and I/O devices such as a mouse and keyboard, among other things.

Virtualized infrastructure 150 is a software-based infrastructure that is hosted on physical hardware of nodes 110. In some embodiments, virtualized infrastructure 150 may be implemented in a cloud computing system, such as a computing system implementing a public cloud in which computing services are offered by a provider over the Internet to the public, a private cloud in which computing services are offered to select users, or a hybrid cloud that includes a combination of an on-premise data center that includes privately owned or controlled servers and a public cloud or a private cloud, and/or the like. In some embodiments, virtualized infrastructure 150 can provide one or more services via an infrastructure as a service (IaaS) delivery model. In some embodiments, virtualized infrastructure 150 can be a hyper-converged infrastructure that includes virtualized compute, storage, network and security, and management. One example of a hyper-converged infrastructure is the Acropolis™ infrastructure made commercially available from Nutanix, Inc. of San Jose, California Illustratively, in virtualized infrastructure 150, virtualization is used to provision physical hardware resources of nodes 110, across multiple VMs $116_{1-M}$ (referred to herein individually as a VM 116 and collectively as VMs 116) that run on top of software interface layers, shown as hypervisor 130 in node $110_1$, in nodes 110.

As shown, VM $116_1$ includes virtual hardware 122, on which a guest OS 118 and applications (not shown) can run. Virtual hardware 122 can include virtual CPUs, virtual memory, etc. that are supported by physical CPUs, system memory, etc. included in physical hardware 112. In particular, virtual hardware 122 includes a virtual device 124 that is controlled via a device driver 120 in guest OS 118. Virtual device 124 can be a virtualization of any technically feasible hardware device, such as a storage device or graphics card. For example, virtual device 124 could be a virtual PCI (Peripheral Component Interconnect) device.

Virtual hardware 122, including virtual device 124, is implemented in hypervisor 130. In some embodiments, virtual device 124 is managed by a combination of a user-space virtual machine monitor (VMM) 132 and a kernel-space VMM 136. For example, user-space VMM 132 could be QEMU, and kernel-space VMM 136 could be kernel-based virtual machine (KVM).

As shown, user-space VMM 132 implements a proxy device 134 and communicates with a device monitor 140 via a device implementation proxy 138. For example, device implementation proxy 138 could be a protocol such as VFIO-user (Virtual Function I/O-user) that enables pass-through communication with an emulated device 142 or a physical device 114. Illustratively, device monitor 140 implements an emulated device 142, and device monitor 140 further provides pass-through access to physical device 114. To implement emulate device 142, device monitor 240 can handle reads, writes, and DMA accesses by guest OS 118 to virtual device 124 and update the state of emulated device 142, as appropriate. To provide pass-through access to physical device 114, device monitor 240 can execute set-up code that arranges the pass-through access in some embodiments.

Device implementation proxy 138 permits the device implementation to be delegated to device monitor 140, rather than implemented by user-space VMM 132 itself. Accordingly, whether a device is a physical device or emulated in software can be hidden to user-space VMM 132 and VM $116_1$. In some embodiments, when emulated device 142 is used to support virtual device 124, device accesses are made to the system memory of node $110_1$, rather than to a physical device. Alternatively, virtual device 124 can be supported by physical device 114, where device monitor 140 provides pass-through communication 146 to physical device 114, as well as some communication to proxy device 134 that is handled by user-space VMM 132. It should be understood that a physical device (e.g., physical device 114) may not be available in some embodiments. In such cases, a device monitor (e.g., device monitor 140) can only implement an emulated device.

In some embodiments, device monitor 140 is able to set and query internal device states of emulated device 142 and physical device 114, among other things. In some embodiments, a distinct device monitor instance is executed for each virtual device of a VM. In other embodiments, a device monitor instance can emulate multiple devices and/or provide pass-through access to multiple physical devices. Although shown as a user-space process in hypervisor 130, in some embodiments, a device monitor can be implemented using any technically feasible software, including software running in the kernel of hypervisor 130, in a VM 116, and/or elsewhere.

System 100 further includes a control plane 106 that communicates with nodes 110 via a network 160. One example of control plane software is Prism®, made commercially available from Nutanix, Inc. Although shown as being distinct from nodes 110, control plane 106 can be implemented in any technically feasible fashion, including as an application that runs on nodes 110s and/or in VMs 116.

In some embodiments, the device implementation that supports a virtual device (e.g., virtual device 124 of VM $116_1$) can be switched in response to a trigger condition. For example, physical device 114 implementation could be replaced with emulated device 142 implementation during the switch, or vice versa, as discussed in greater detail below in conjunction with FIGS. 2-5. As additional examples, physical device 114 could be replaced with another physical device, or an emulated device could be replaced with another emulated device. In addition, the device implementations occur entirely within a hypervisor (e.g., hypervisor 130) and is transparent to the VM (e.g., VM $116_1$). Examples of trigger conditions include migration of a VM between nodes and run-time resource utilization on a node satisfying various criteria.

Switching Source Device Implementations for a Virtual Device

As described, in some embodiments, a VMM can switch the device implementation that supports a virtual device of a VM. In particular, the VMM can substitute one device implementation for another without the VM being aware of the switch.

Figure 2:
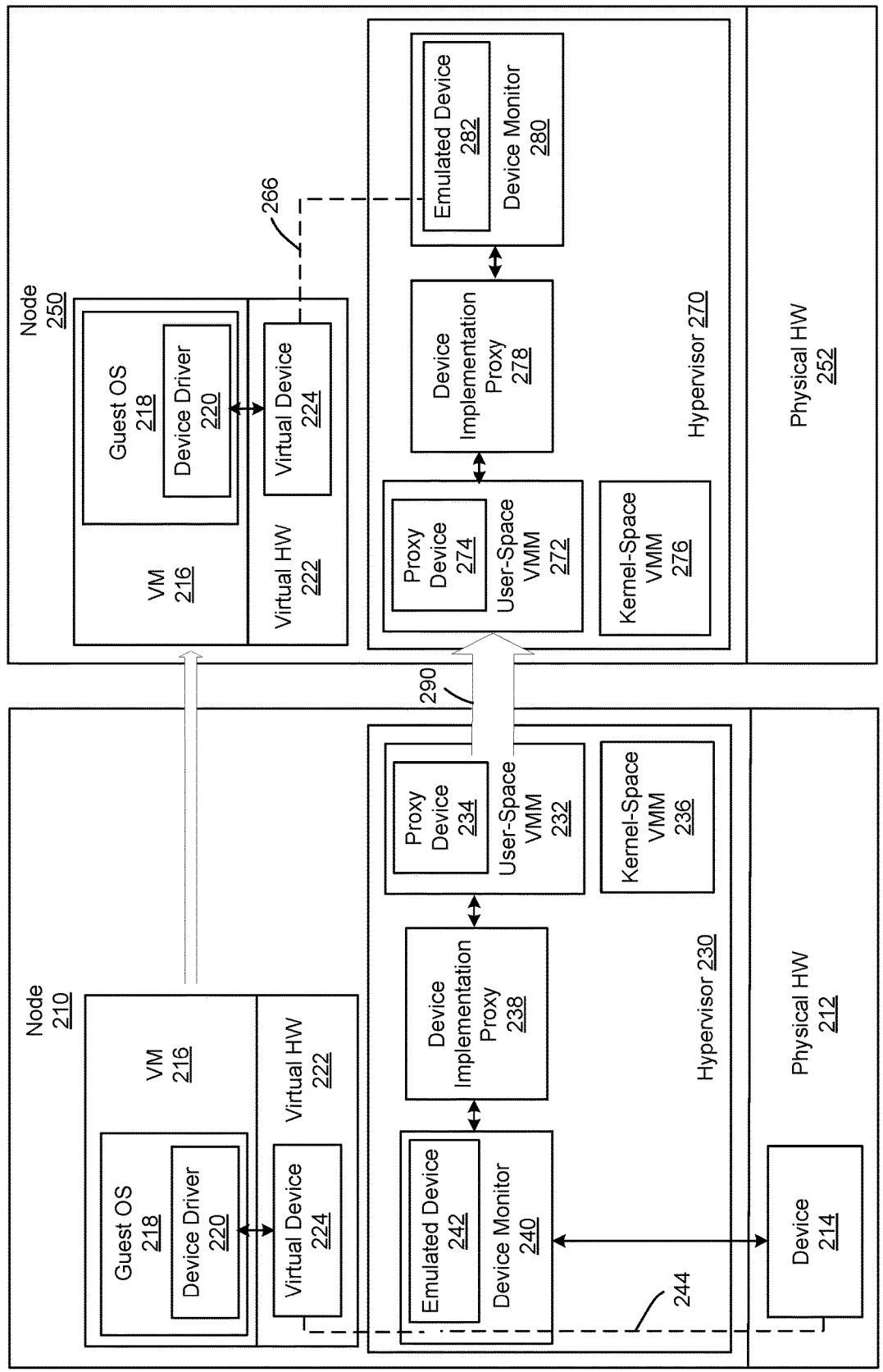
FIG. 2 illustrates an example virtual machine migration in which a device implementation is switched from a physical implementation to an emulated implementation, according to various embodiments.

FIG. 2 illustrates an example VM migration in which a device implementation is switched from a physical implementation to an emulated implementation (also referred to herein as a "software implementation"), according to various embodiments. As shown, a VM 216 runs initially in a node 210, on which a virtual device 224 of the VM 216 is supported by pass-through access to a physical device 214 that is provided by a device monitor 240. In some embodiments, device monitor 240 can execute set-up code that arranges the pass-through access to the physical device 214. When VM 216 is migrated to another node 250, the device implementation for virtual device 224 is switched to an emulated device 282, because node 250 does not include or does not have available a physical device that can be used in place of physical device 214. Nodes 210 and 250, and components therein, are similar to node 110$_1$ and corresponding components therein, described above in conjunction with FIG. 1.

In some embodiments, migrating VM 216 includes copying a VM configuration, memory contents of VM 216, and a device state associated with physical device 214, from node 210 to node 250, so that VM 216 can be re-created on node 250. In some embodiments, user-space VMM 232 requests the device state from device monitor 240 via device implementation proxy 238. For example, device implementation proxy 238 could provide an application programming interface (API) that user-space VMM 232 invokes to request the device state. As a particular example, device implementation proxy 238 could be implemented using VFIO-user. In addition, the VM configuration and memory contents can be captured by user-space VMM 232 in any technically feasible manner, including using known techniques. It should be understood that other VM migration operations, such as pausing the VM during a live migration, can also be performed in some embodiments.

As shown, user-space VMM 232 transfers 290 the device state that is returned by device monitor 240 (along with the VM configuration and memory contents) to user-space VMM 272 running in node 250. In turn, user-space VMM 272 requests, via device implementation proxy 278, that device monitor 280 set the state of emulated device 282 to the transferred device state. Device implementation proxy 278 is similar to device implementation proxy 238, described above. For example, device implementation proxy 238 could provide an application programming interface (API) and a remote procedure call (RPC) mechanism that user-space VMM 272 can invoke to set the state of emulated device 282 to the transferred device state, among other things. In addition, user-space VMM 272 requests, from device monitor 280, memory addresses associated with device implementations provided by device monitor 240. Because node 250 does not include a physical device corresponding to physical device 214, device monitor 240 returns memory addresses associated with emulated device 282. Then, user-space VMM 272 maps memory addresses associated with virtual device 224 of VM 216 to the memory addresses of emulated device 282. Then, guest OS 218 can map portions of the memory addresses associated with virtual device 224 to an address space associated with the guest OS 218 so that reads and writes to the address space associated with guest OS 218 trigger, e.g., PCI read and write transactions to virtual device 224. Accordingly, memory regions on virtual device 224, whether physical or emulated, are shared with guest OS 218, and virtual device 224 can also access guest OS 218 memory as need in some embodiments. In addition, user-space VMM 272 maps interrupts to software event generators associated with emulated device 282 (rather than hardware interrupts) and reroutes API calls to emulated device 282. Doing so switches the device implementation from physical device 214 to emulated device 282, and further provides pass-through access 266 to emulated device 282.

Accordingly, when a VM (e.g., VM 216) is migrated across nodes, which can be in different data centers or clouds, the device implementation used to support a virtual device of the VM can leverage a physical device when available and fall back to a software alternative when no physical device is available. Then, when a physical device becomes available on a node, the VM can be migrated to that node to utilize the physical device. Further, the switching of device implementations during a VM migration can be transparent to the VM.

Although a VM migration between nodes is shown for exemplary purposes in FIG. 2, other conditions can trigger a switch between device implementations for a virtual device in some embodiments. For example, a trigger condition can include the migration of a VM within the same node, which is similar to the migration between nodes, except the VM is migrated to another VMM running in the same node. As another example, a trigger condition can include receiving a message from control plane 102 to switch the device implementation, as discussed in greater detail below in conjunction with FIG. 4. For example, a user could initiate, via a user interface provided by control plane 102, a switch from a physical device to an emulated device before the user unplugs the physical device. After the switch, the user can unplug the physical device without interrupting the VM. As yet another example, the trigger condition can include run-time resource utilization on a node satisfying various criteria. In such cases, control plane 102 can also transmit a message to the VMM to switch the device implementation.

Although a switch from a physical implementation to an emulated implementation of a virtual device is a shown for exemplary purposes in FIG. 2, in some embodiments, a device implementation can be switched from an emulated implantation to a physical implementation, from a physical implementation to another physical implementation, or from an emulated implementation to another emulated implementation. For example, switching from a physical implementation to another physical implementation can include migrating a VM, either within the same node or across nodes, to utilize a physical device in a destination node that can perform the same functionality as a physical device in a source node (which can be same node as the destination node). As another example, in order to debug device monitor 240, a user could initiate a switch from emulated device 242 provided by device monitor 240 to another emulated device provided by an updated version of device monitor 240.

Figure 3:
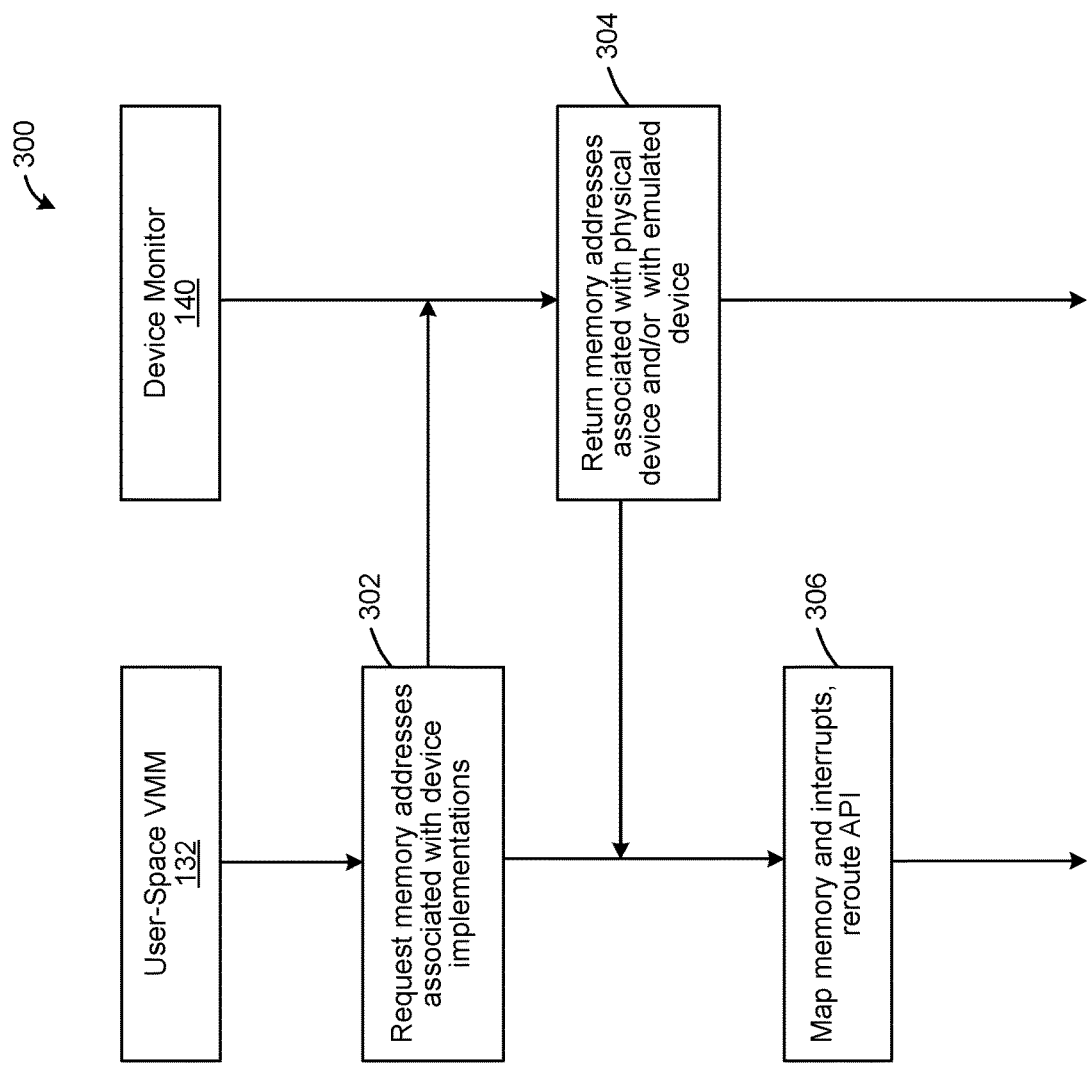
FIG. 3 is a flow diagram of method steps for configuring a virtual device of a virtual machine, according to various embodiments.

FIG. 3 is a flow diagram of method steps for configuring a virtual device of a virtual machine, according to various embodiments. Although the method steps are described in conjunction with the system of FIG. 1, persons of ordinary skill in the art will understand that any system configured to perform the method steps, in any order, is within the scope of the present disclosure.

As shown, a method 300 begins at step 302, where user-space VMM 132 requests, from device monitor 140, memory addresses associated with device implementations provided by device monitor 140. In some embodiments, user-space VMM 132 can make the request at step 302 when setting up a new VM. In addition, user-space VMM 132 can make the request at step 302 via a protocol (e.g., VFIO-user) provided by device implementation proxy 138 in some embodiments.

At step 304, device monitor 140 returns memory addresses associated with a physical device and/or with an emulated device. As described, device monitor 140 can implement an emulated device (e.g., emulated device 142) and/or provide pass-through access to a physical device (e.g., physical device 114) in some embodiments. Device monitor 140 returns memory addresses associated with such a physical device and/or emulated device at step 304.

At step 306, user-space VMM 132 maps memory addresses associated with the virtual device of a VM to the memory addresses of either the physical device or the emulated device returned by device monitor 140, and user-space VMM 132 further maps interrupts to an appropriate callback source and maps API calls from guest OS 218 to an appropriate API implementation that is associated with the physical device or the emulated device. As used herein, the API implementation associated with the physical device or the emulated device refers to facilities provided by the physical device or the emulated device on top of device memory regions. For example, for an NVMe (nonvolatile memory express) device, the API implementation can define a set of NVMe commands, and the RPC mechanism for the NVME commands can involve writing to an area of memory and then sending a PCI transaction to the NVMe device at a particular device BAR (base address register) offset. The memory and interrupt mappings, and the mapping of API calls, can be achieved in any technically feasible manner, including using known techniques, in some embodiments. Thereafter, memory accesses by guest OS 218 and/or VM 216 to memory addresses associated with virtual device 224 are automatically routed to the physical device or emulated device that is implementing virtual device 224. For example, PCI read and write transactions to virtual device 224 can be automatically provided to the physical device or the emulated device. In some embodiments, mapping the interrupts can include arranging the interrupt delivery to guest OS 218 to be from a hardware interrupt source or a software event generator source provided by device monitor 140, depending on whether the physical device or the emulated device implementation is used. In such cases, user-space VMM 132 can request, from device monitor 140, information on what interrupts the physical device or the emulated device can trigger, and then route the interrupts as appropriate. The memory, interrupt, and API mapping at step 306 sets up virtual device 224 so that guest OS 218 can read, write, and perform DMA transfers to virtual device 224. In addition, guest OS 218 can respond to interrupts from virtual device 224, which is routed from a hardware interrupt source in the case of the physical implementation or a software event generator source provided by device monitor 140 in the case of the emulated implementation.

In some embodiments, user-space VMM 132 can select to utilize the physical device or the emulated device (assuming both are available) using any technically feasible criteria. For example, in some embodiments, user-space VMM 132 always selects to use the physical device when such a device is available because physical devices are, as a general matter, more performant relative to emulated devices. As another example, in some embodiments, user-space VMM 132 can select to use the physical device or the emulated device based on run-time resource utilization of the physical device satisfying various criteria. In some embodiments, selection of the physical device or the emulated device is made instead by device monitor 140. In such cases, device monitor 140 can return, at step 304, either memory addresses associated with a physical device or with an emulated device that device monitor 140 selects, and whether the physical device or the emulated device is selected would be transparent to user-space VMM 132.

Figure 4:
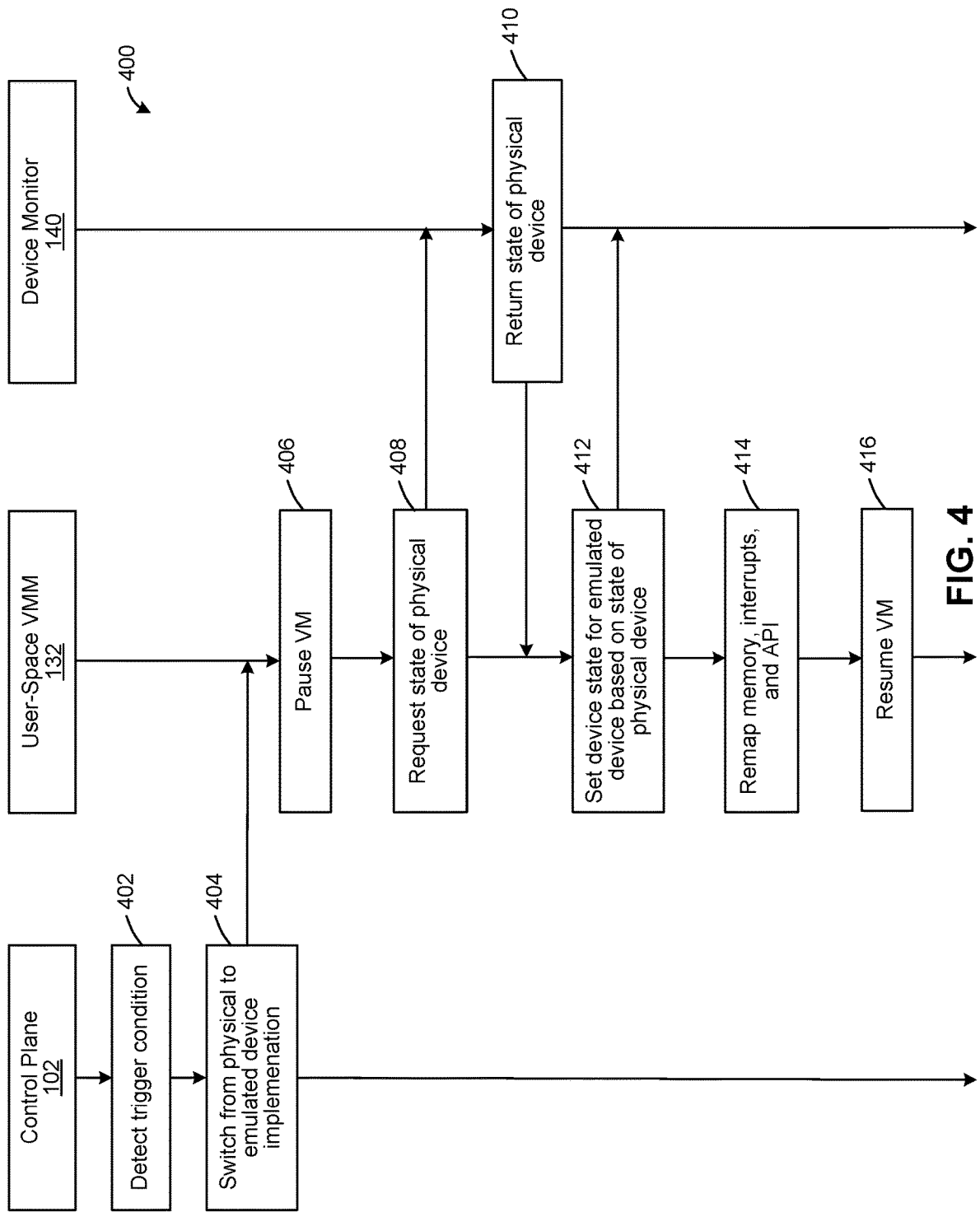
FIG. 4 is a flow diagram of method steps for switching a device implementation from a physical implementation to an emulated implementation, according to various embodiments.

FIG. 4 is a flow diagram of method steps for switching a device implementation from a physical implementation to an emulated implementation, according to various embodiments. Although the method steps are described in conjunction with the system of FIG. 1, persons of ordinary skill in the art will understand that any system configured to perform the method steps, in any order, is within the scope of the present disclosure. Although FIG. 4 is described with respect to switching a device implementation from a physical implementation to an emulated implementation of a virtual device, in some embodiments, similar steps can be performed to switch a device implementation from an emulated implantation to a physical implementation, from a physical implementation to another physical implementation, or from an emulated implementation to another emulated implementation.

As shown, a method 400 begins at step 402, where control plane 102 detects a condition that triggers switching of a device implementation of a virtual device associated with a VM from a physical device to an emulated device. Any technically feasible trigger condition can be detected. For example, run-time resource utilization of the physical device could meet various criteria, triggering the switch. As another example, control plane 102 could receive user input to switch the implementation via a user interface. For example, assume the user could initiate, via the user interface, the switch from the physical device to the emulated device before the user unplugs the physical device. After the switch, the user can unplug the physical device without interrupting the VM.

At step 404, control plane 102 transmits, to user-space VMM 132, a message to switch from the physical device implementation to the emulated device implementation.

At step 406, user-space VMM 132 pauses the VM.

At step 408, user-space VMM 132 requests, from device monitor 140, the state of the physical device. In some embodiments, the state of the physical device can include device register and internal states.

At step 410, device monitor 140 returns the state of the physical device in response to the request from user-space VMM 132 at step 406. As described, device monitor 140 is able to query and set internal device states.

At step 412, user-space VMM 132 transmits, to device monitor 140, a message to set the device state for an emulated device based on the state of the physical device. That is, VMM 132 copies the device state of the physical device to the emulated device. In some embodiments, VMM 132 can also perform any translations of the device state of the physical device that are necessary to enable the device state to be set on the emulated device.

At step 414, user-space VMM 132 remaps memory addresses associated with the virtual device of the VM to memory addresses associated with the emulated device, and user-space VMM 132 further remaps interrupts and remaps API calls to an API implementation associated with the emulated device. Step 412 is similar to step 306 of method 300, described above in conjunction with FIG. 3.

At step 416, user-space VMM 132 resumes the VM.

Figure 5:
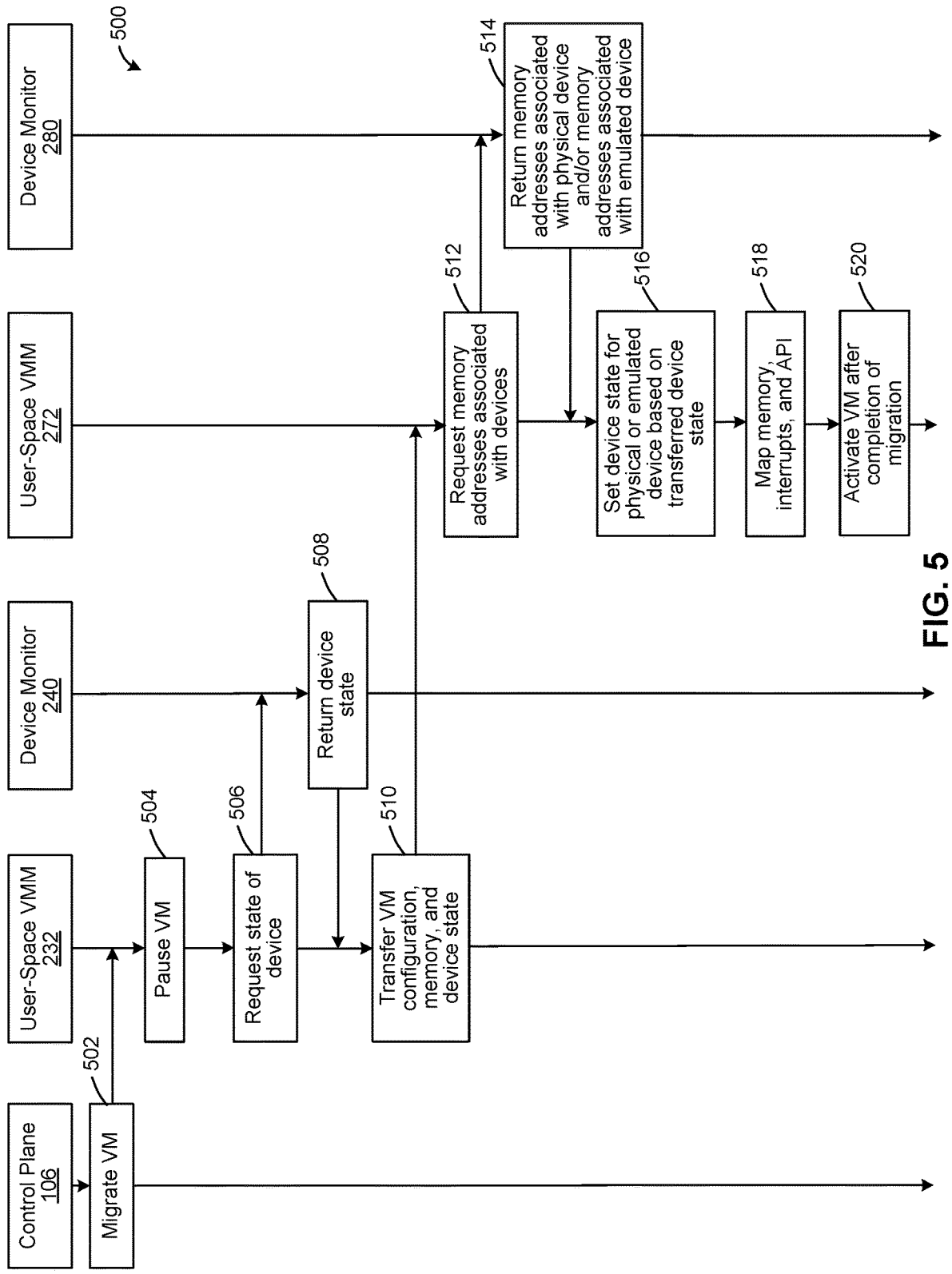
FIG. 5 is a flow diagram of method steps for switching a device implementation during a virtual machine migration, according to various embodiments.

FIG. 5 is a flow diagram of method steps for switching a device implementation during a virtual machine migration, according to various embodiments. Although the method steps are described in conjunction with the system of FIG. 2, persons of ordinary skill in the art will understand that any system configured to perform the method steps, in any order, is within the scope of the present disclosure.

As shown, a method 500 begins at step 502, where control plane 106 transmits, to user-space VMM 232, a message to migrate a VM. The VM migration can be triggered in any technically feasible manner, such as by a user or automatically for load balancing or failover purposes.

At step 504, user-space VMM 132 pauses the VM.

At step 506, user-space VMM 232 requests, from device monitor 240, the state of a device associated with a virtual device of the VM. The device can be a physical device or an emulated device that is the source device for the virtual device of the VM.

At step 508, device monitor 240 returns the device state that was requested at step 504. As described, device monitor 240 is able to query and set internal device states, among other things.

At step 510, user-space VMM 232 transfers the VM configuration and memory contents, along with the device state received from device monitor 240, to user-space VMM 272. The VM configuration and memory contents can be captured by user-space VMM 232 in any technically feasible manner, including using known techniques.

At step 512, user-space VMM 272 requests, from device monitor 240, memory addresses associated with device implementations provided by device monitor 240. Step 510 is similar to step 302 of method 300, described above in conjunction with FIG. 3.

At step 514, device monitor 240 returns memory addresses associated with a physical device and/or an emulated device. Step 512 is similar to step 304 of method 300, described above in conjunction with FIG. 3.

At step 516, user-space VMM 272 sends, to device monitor 280, a message to set a device state for the physical device or the emulated device based on the transferred device state. That is, in addition to the VM configuration and memory contents, the device state is copied over to destination node 250 and set for the physical device or the emulated device. Notably, the device implementation can change from the source node 210 to the destination node 250. For example, if the source node 210 has a physical device that supports the virtual device 124, but the destination node 250 does not, then the user-space VMM 272 could set the device state for an emulated device to a copy of the device state from the physical device that is transferred to the destination node 250 and perform any translations of the device state that are necessary to enable the same.

At step 518, user-space VMM 272 maps memory addresses associated with the virtual device of the VM to the memory addresses of the physical device or emulated device, and user-space VMM 272 further maps interrupts and remaps API calls to an API implementation associated with the physical device or emulated device. Step 516 is similar to step 306 of method 300, described above in conjunction with FIG. 3. Although described with respect to the user-space VMM 272 selecting to use the physical device or the emulated device, in some embodiments, selection of the physical device or the emulated device is made instead by device monitor 280. In such cases, device monitor 280 can return, at step 514, either memory addresses associated with a physical device or with an emulated device that device monitor 280 selects, and whether the physical device or the emulated device is selected would be transparent to user-space VMM 272.

At step 520, user-space VMM 272 activates the VM after completion of the migration. As described, in addition to steps 512-518, other known VM migration operations, such as configuring the VM on the destination node, etc., can also be performed in some embodiments.

In sum, techniques are disclosed for switching the device implementation that supports a virtual device associated with a VM or other virtual computing instance. In some embodiments, a device monitor that implements an emulated device and provides pass-through access to a physical device can be used to copy the state of the emulated device to the physical device, or vice versa, and switch between the emulated and physical device implementations without the VM or other virtual computing instance being aware of the switch. The switch can be triggered by a migration of the VM or other virtual computing instance between nodes, run-time resource utilization on a node satisfying various criteria, among other things.

At least one technical advantage of the disclosed techniques relative to the prior art is that the disclosed techniques permit switching between device implementations for a virtual device in a manner that is transparent to a virtual computing instance associated with the virtual device. A hardware implementation can be used when a physical device is available, and a switch can be made to a software implementation when the physical device becomes unavailable, such as when the virtual computing instance is migrated to another node that does include the physical device. In addition, a switch between a hardware implementation and a software implementation can be made based on resource utilization of a physical device that provides the hardware implementation. These technical advantages provide one or more technological advancements over prior art approaches.

Exemplary Virtualization System Architectures

According to some embodiments, all or portions of any of the foregoing techniques described with respect to FIGS. 1-5 can be partitioned into one or more modules and instanced within, or as, or in conjunction with a virtualized controller in a virtual computing environment. Some example instances within various virtual computing environments are shown and discussed in further detail in FIGS. 6A-6D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 6A:
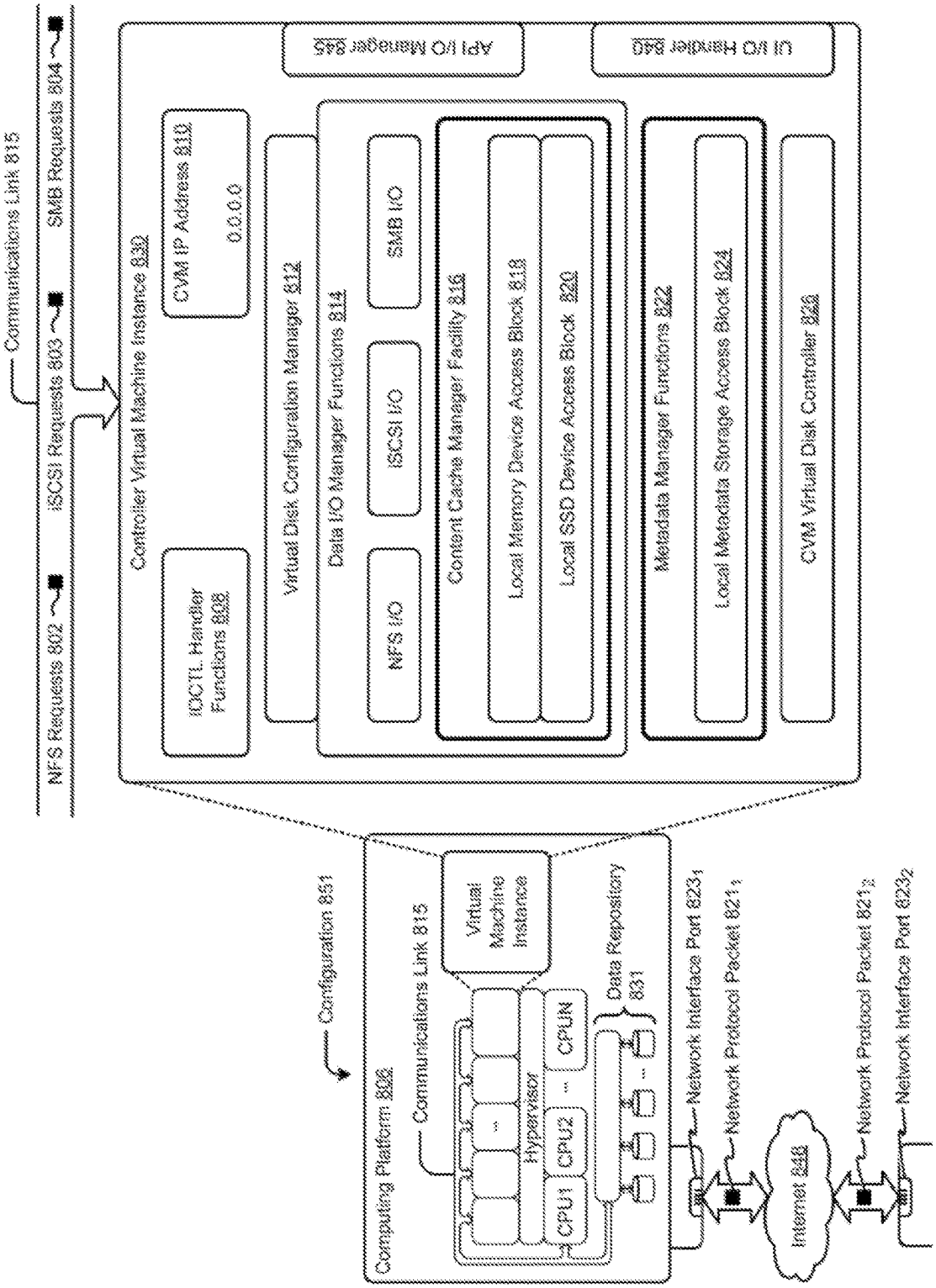
FIGS. 6A-6D are block diagrams illustrating virtualization system architectures configured to implement one or more aspects of the present embodiments.

FIG. 6A is a block diagram illustrating virtualization system architecture 8A00 configured to implement one or more aspects of the present embodiments. As shown in FIG. 6A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, ..., CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 6B:
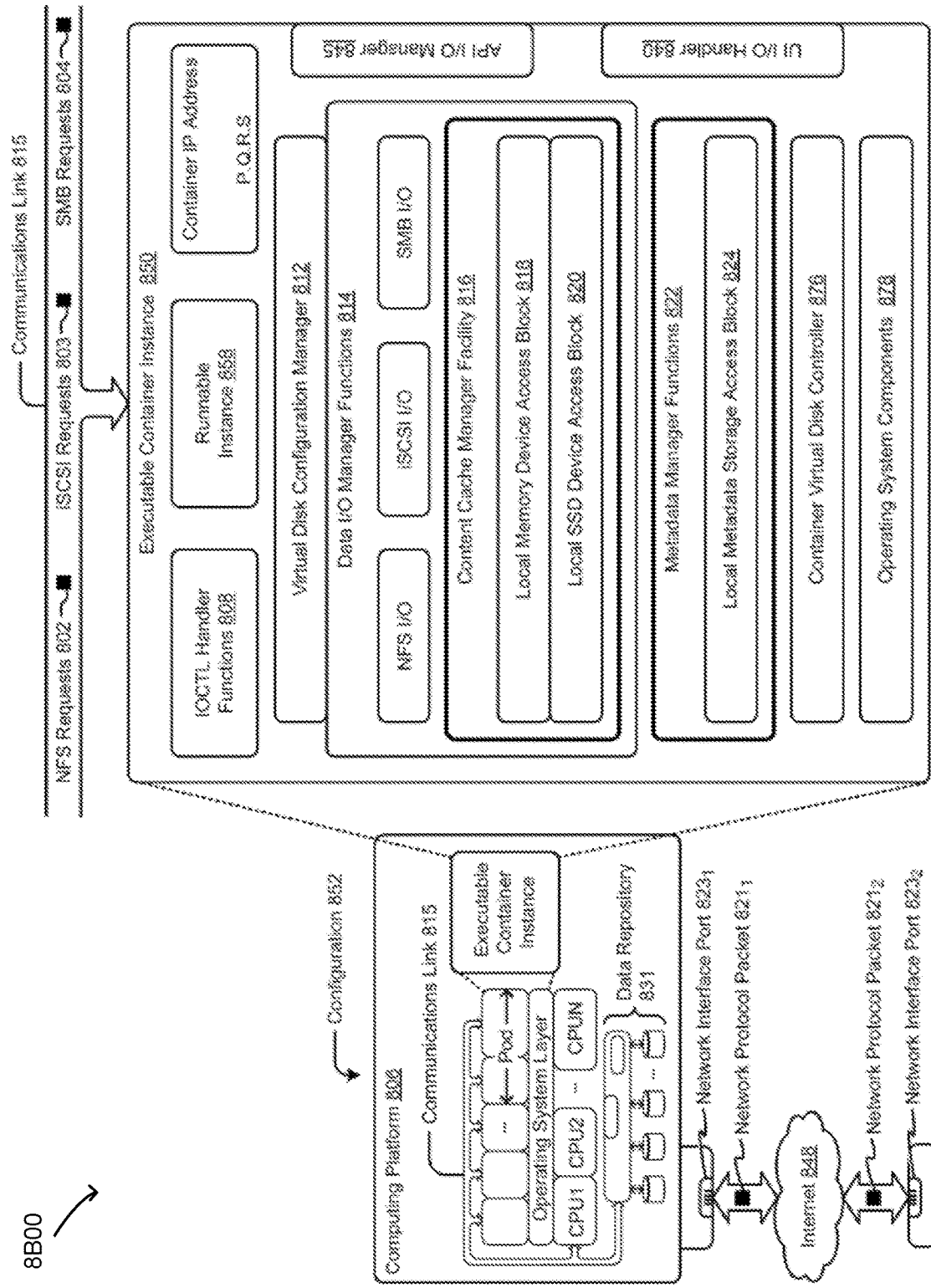

FIG. 6B depicts a block diagram illustrating another virtualization system architecture 8B00 configured to implement one or more aspects of the present embodiments. As shown in FIG. 6B, virtualization system architecture 8B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
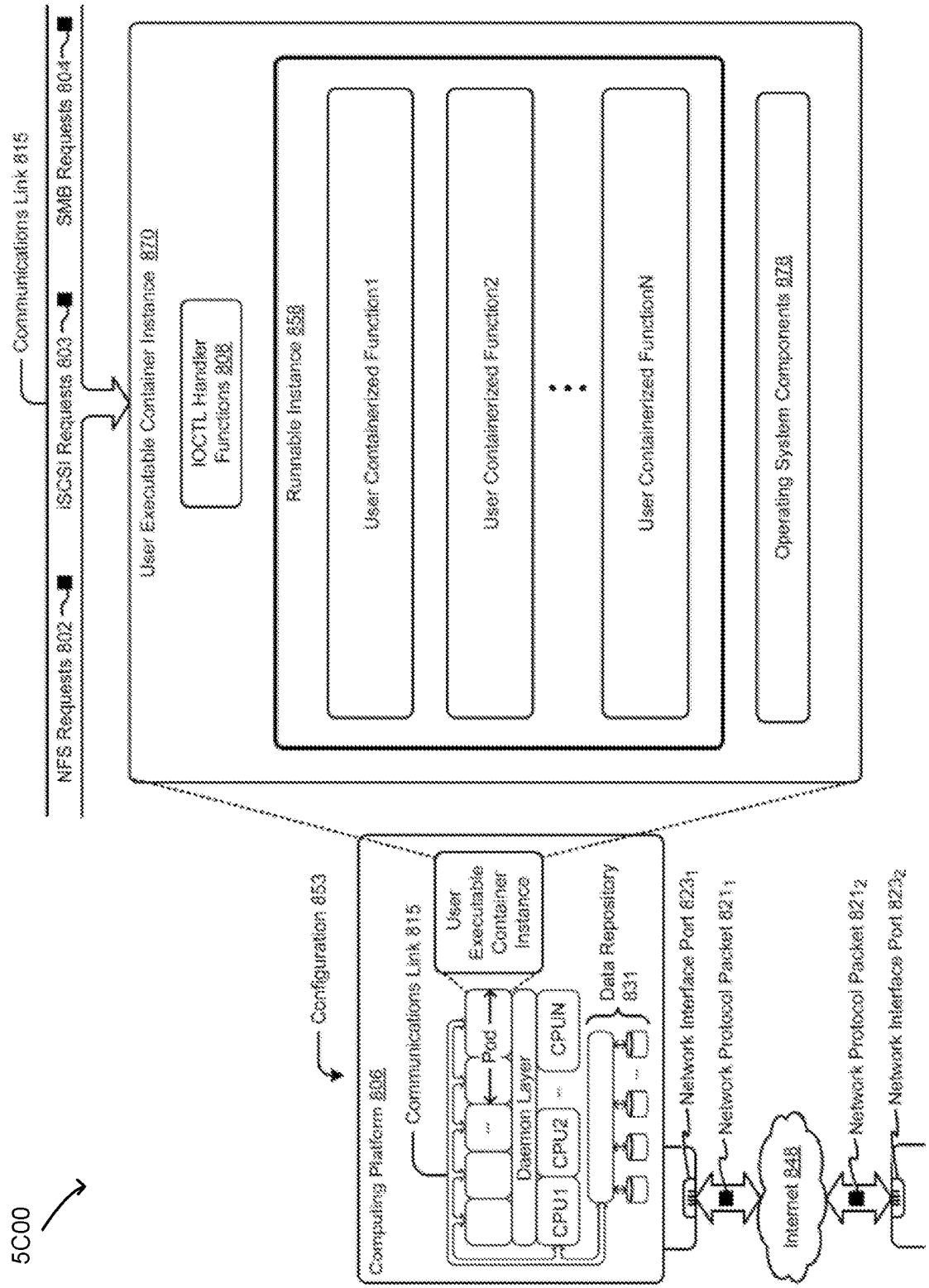

FIG. 6C is a block diagram illustrating virtualization system architecture 8C00 configured to implement one or more aspects of the present embodiments. As shown in FIG. 6C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8B00, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
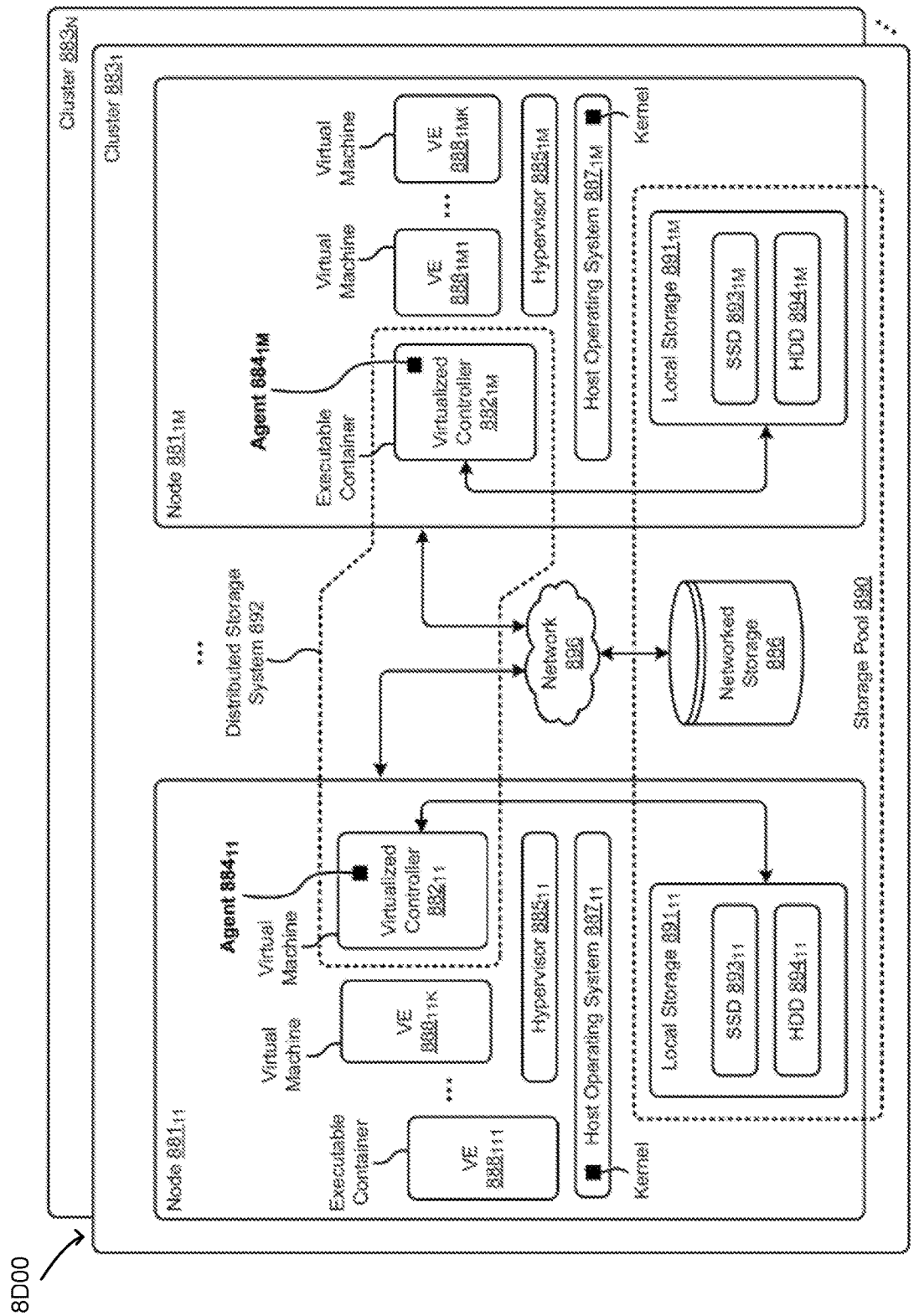

FIG. 6D is a block diagram illustrating virtualization system architecture 8D00 configured to implement one or more aspects of the present embodiments. As shown in FIG. 6D, virtualization system architecture 8D00 includes a distributed virtualization system that includes multiple clusters (e.g., cluster 8831, . . . , cluster 883N) comprising multiple nodes that have multiple tiers of storage in a storage pool. Representative nodes (e.g., node 88111, . . . , node 8811M) and storage pool 890 associated with cluster 8831 are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage 89111, . . . , local storage 8911M). For example, the local storage can be within or directly attached to a server and/or appliance associated with the nodes. Such local storage can include solid state drives (SSD 89311, . . . , SSD 8931M), hard disk drives (HDD 89411, . . . , HDD 8941M), and/or other storage devices.

As shown, any of the nodes of the distributed virtualization system can implement one or more user virtualized entities (e.g., VE 888111, . . . , VE 88811K, . . . , VE 8881M1, . . . , VE 8881MK), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 88711, . . . , host operating system 8871M), while the VMs run multiple applications on various respective guest operating systems. Such flexibility can be facilitated at least in part by a hypervisor (e.g., hypervisor 88511, . . . , hypervisor 8851M), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system 88711, . . . , host operating system 8871M) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node 88111 can interface with a controller virtual machine (e.g., virtualized controller 88211) through hypervisor 88511 to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller 8821M) in an operating system virtualization environment at a given node. In this case, for example, the virtualized entities at node 8811M can access the storage pool 890 by interfacing with a controller container (e.g., virtualized controller 8821M) through hypervisor 8851M and/or the kernel of host operating system 8871M.

In some embodiments, one or more instances of an agent can be implemented in the distributed storage system 892 to facilitate the herein disclosed techniques. Specifically, agent 88411 can be implemented in the virtualized controller 88211, and agent 8841M can be implemented in the virtualized controller 8821M. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 7:
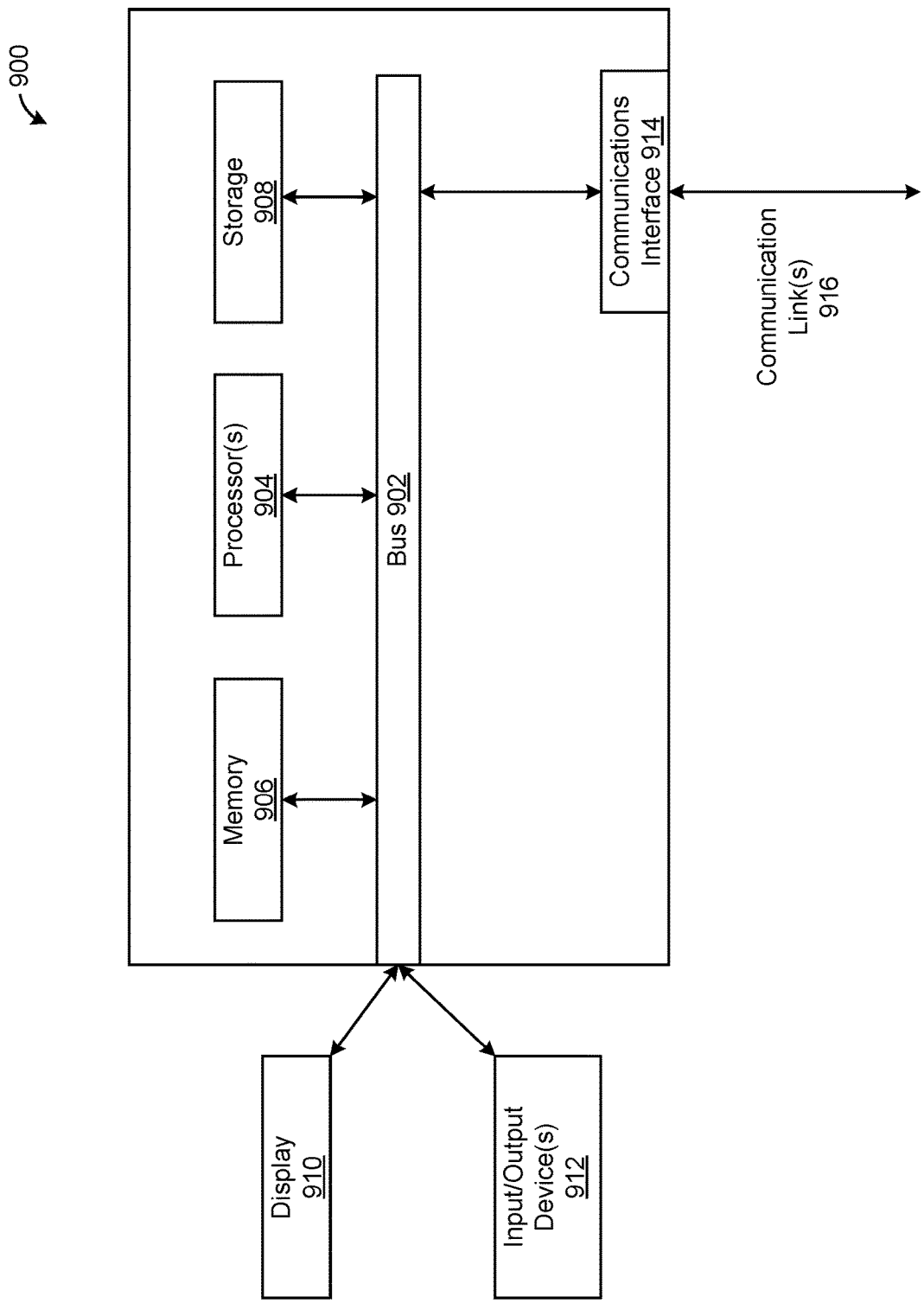
FIG. 7 is a block diagram illustrating a computer system configured to implement one or more aspects of the present embodiments.

FIG. 7 is a block diagram illustrating a computer system 900 configured to implement one or more aspects of the present embodiments. In some embodiments, computer system 900 may be representative of a computer system for implementing one or more aspects of the embodiments disclosed in FIGS. 1-5. In some embodiments, computer system 900 is a server machine operating in a data center or a cloud computing environment suitable for implementing an embodiment of the present invention. As shown, computer system 900 includes a bus 902 or other communication mechanism for communicating information, which interconnects subsystems and devices, such as one or more processors 904, memory 906, storage 908, optional display 910, one or more input/output devices 912, and a communications interface 914. Computer system 900 described herein is illustrative and any other technically feasible configurations fall within the scope of the present disclosure.

The one or more processors 904 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 904 may be any technically feasible hardware unit capable of processing data and/or executing software applications. Further, in the context of this disclosure, the computing elements shown in computer system 900 may correspond to a physical computing system (e.g., a system in a data center) or may be a virtual computing instance, such as any of the virtual machines described in FIGS. 5A-5D.

Memory 906 includes a random-access memory (RAM) module, a flash memory unit, and/or any other type of memory unit or combination thereof. The one or more processors 904, and/or communications interface 914 are configured to read data from and write data to memory 906. Memory 906 includes various software programs that include one or more instructions that can be executed by the one or more processors 904 and application data associated with said software programs.

Storage 908 includes non-volatile storage for applications and data, and may include one or more fixed or removable disk drives, HDDs, SSD, NVMes, vDisks, flash memory devices, and/or other magnetic, optical, and/or solid-state storage devices.

Communications interface 914 includes hardware and/or software for coupling computer system 900 to one or more communication links 915. The one or more communication links 915 may include any technically feasible type of communications network that allows data to be exchanged between computer system 900 and external entities or devices, such as a web server or another networked computing system. For example, the one or more communication links 915 may include one or more wide area networks (WANs), one or more local area networks (LANs), one or more wireless (WiFi) networks, the Internet, and/or the like.

1. In some embodiments, one or more non-transitory computer-readable media store program instructions that, when executed by one or more processors, cause the one or more processors to perform steps of mapping a virtual device of a virtual computing instance to a first device implementation, and in response to a trigger condition, remapping the virtual device to a second device implementation, wherein the remapping is transparent to the virtual computing instance.

2. The one or more non-transitory computer-readable media of clause 1, wherein the first device implementation comprises at least one of a physical or a software implementation, and the second device implementation comprises at least one of a physical or a software implementation.

3. The one or more non-transitory computer-readable media of clauses 1 or 2, wherein, the trigger condition comprises at least one of a migration of the virtual computing instance, a resource utilization of the first device satisfying one or more criteria, or receipt of a message from a control plane.

4. The one or more non-transitory computer-readable media of any of clauses 1-3, wherein remapping the virtual device comprises copying a device state from the first device implementation to the second device implementation.

5. The one or more non-transitory computer-readable media of any of clauses 1-4, wherein a device monitor provides the second device implementation and pass-through access to the first device implementation.

6. The one or more non-transitory computer-readable media of any of clauses 1-5, wherein the program instructions, when executed by the one or more processors, further cause the one or more processors to perform steps of requesting one or more memory addresses associated with the second device implementation from a device monitor, wherein remapping the virtual device to the second device implementation comprises remapping one or more memory addresses associated with the virtual device to the one or more memory addresses associated with the second device implementation.

7. The one or more non-transitory computer-readable media of any of clauses 1-6, wherein remapping the virtual device to the second device implementation comprises remapping interrupts to be routed to the virtual computing instance from an interrupt source associated with the second device implementation.

8. The one or more non-transitory computer-readable media of any of clauses 1-7, wherein remapping the virtual device to the second device implementation comprises mapping application programming interface (API) calls from the virtual computing instance to an API implementation associated with the second device implementation.

9. The one or more non-transitory computer-readable media of any of clauses 1-8, wherein the program instructions, when executed by the one or more processors, further cause the one or more processors to perform steps of pausing execution of the virtual computing instance during the remapping.

10. The one or more non-transitory computer-readable media of any of clauses 1-9, wherein the virtual computing instance comprises a virtual machine.

11. In some embodiments, a computer-implemented method for managing devices in a virtual environment comprises mapping a virtual device of a virtual computing instance to a first device implementation, and in response to a trigger condition, remapping the virtual device to a second device implementation, wherein the remapping is transparent to the virtual computing instance.

12. The computer-implemented method of clause 11, wherein the first device implementation comprises at least one of a physical or a software implementation, and the second device implementation comprises at least one of a physical or a software implementation.

13. The computer-implemented method of clauses 11 or 12, wherein, the trigger condition comprises at least one of a migration of the virtual computing instance, a resource utilization of the first device satisfying one or more criteria, or receipt of a message from a control plane.

14. The computer-implemented method of any of clauses 11-13, wherein remapping the virtual device comprises copying a device state from the first device implementation to the second device implementation.

15. The computer-implemented method of any of clauses 11-14, wherein a device monitor provides the second device implementation and pass-through access to the first device implementation.

16. The computer-implemented method of any of clauses 11-15, further comprising requesting one or more memory addresses associated with the second device implementation from a device monitor, wherein remapping the virtual device to the second device implementation comprises remapping one or more memory addresses associated with the virtual device to the one or more memory addresses associated with the second device implementation.

17. The computer-implemented method of any of clauses 11-16, wherein remapping the virtual device to the second device implementation comprises remapping interrupts to be routed to the virtual computing instance from an interrupt source associated with the second device implementation.

18. The computer-implemented method of any of clauses 11-17, wherein remapping the virtual device to the second device implementation comprises mapping application programming interface (API) calls from the virtual computing instance to an API implementation associated with the second device implementation.

19. The computer-implemented method of any of clauses 11-18, further comprising pausing execution of the virtual computing instance during the remapping.

20. The computer-implemented method of any of clauses 11-19, wherein the virtual computing instance comprises a virtual machine.

21. In some embodiments, a system comprises one or more memories that include instructions, and one or more processors that are coupled to one or more memories and, when executing the instructions map a virtual device of a virtual computing instance to a first device implementation, and in response to a trigger condition, remap the virtual device to a second device implementation, wherein the remapping is transparent to the virtual computing instance.

22. The system of clause 21, wherein the first device implementation comprises at least one of a physical or a software implementation, and the second device implementation comprises at least one of a physical or a software implementation.

23. The system of clauses 21 or 22, wherein, the trigger condition comprises at least one of a migration of the virtual computing instance, a resource utilization of the first device satisfying one or more criteria, or receipt of a message from a control plane.

24. The system of any of clauses 21-23, wherein remapping the virtual device comprises copying a device state from the first device implementation to the second device implementation.

25. The system of any of clauses 21-24, wherein a device monitor provides the second device implementation and pass-through access to the first device implementation.

26. The system of any of clauses 21-25, wherein the one or more processors, when executing the instructions, further request one or more memory addresses associated with the second device implementation from a device monitor, wherein remapping the virtual device to the second device implementation comprises remapping one or more memory addresses associated with the virtual device to the one or more memory addresses associated with the second device implementation.

27. The system of any of clauses 21-26, wherein remapping the virtual device to the second device implementation comprises remapping interrupts to be routed to the virtual computing instance from an interrupt source associated with the second device implementation.

28. The system of any of clauses 21-27, wherein remapping the virtual device to the second device implementation comprises mapping application programming interface (API) calls from the virtual computing instance to an API implementation associated with the second device implementation.

29. The system of any of clauses 21-28, wherein the one or more processors, when executing the instructions, further pause execution of the virtual computing instance during the remapping.

30. The system of any of clauses 21-29, wherein the virtual computing instance comprises a virtual machine.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:

mapping a virtual device of a virtual computing instance to a first device implementation, the first device implementation and being one of an emulated device or a physical device; and in response to a trigger condition, remapping the virtual device to a second device implementation, the second device implementation being the other of the emulated device or the physical device and wherein the remapping occurs without the virtual computing instance being aware of the remapping.

2. The one or more non-transitory computer-readable media of claim 1, wherein the first device implementation comprises at least one of a physical or a software implementation, and the second device implementation comprises at least one of a physical or a software implementation.

3. The one or more non-transitory computer-readable media of claim 1, wherein, the trigger condition comprises at least one of a migration of the virtual computing instance, a resource utilization of the first device implementation satisfying one or more criteria, or receipt of a message from a control plane.

4. The one or more non-transitory computer-readable media of claim 1, wherein remapping the virtual device comprises copying a device state from the first device implementation to the second device implementation.

5. The one or more non-transitory computer-readable media of claim 1, wherein a device monitor provides the second device implementation and pass-through access to the first device implementation.

6. The one or more non-transitory computer-readable media of claim 1, wherein the program instructions, when executed by the one or more processors, further cause the one or more processors to perform steps of:

requesting one or more memory addresses associated with the second device implementation from a device monitor, wherein remapping the virtual device to the second device implementation comprises remapping one or more memory addresses associated with the virtual device to the one or more memory addresses associated with the second device implementation.

7. The one or more non-transitory computer-readable media of claim 1, wherein remapping the virtual device to the second device implementation comprises remapping interrupts to be routed to the virtual computing instance from an interrupt source associated with the second device implementation.

8. The one or more non-transitory computer-readable media of claim 1, wherein remapping the virtual device to the second device implementation comprises mapping application programming interface (API) calls from the virtual computing instance to an API implementation associated with the second device implementation.

9. The one or more non-transitory computer-readable media of claim 1, wherein the program instructions, when executed by the one or more processors, further cause the one or more processors to perform steps of:

pausing execution of the virtual computing instance during the remapping.

10. The one or more non-transitory computer-readable media of claim 1, wherein the virtual computing instance comprises a virtual machine.

11. A computer-implemented method for managing devices in a virtual environment, the method comprising:

mapping a virtual device of a virtual computing instance to a first device implementation, the first device implementation executing a first node and being one of an emulated device or a physical device; and in response to a trigger condition, remapping the virtual device to a second device implementation, the second device implementation executing on a second node being the other of the emulated device or the physical device and wherein the remapping occurs without the virtual computing instance being aware of the remapping.

12. The computer-implemented method of claim 11, wherein the first device implementation comprises at least one of a physical or a software implementation, and the second device implementation comprises at least one of a physical or a software implementation.

13. The computer-implemented method of claim 11, wherein, the trigger condition comprises at least one of a migration of the virtual computing instance, a resource utilization of the first device implementation satisfying one or more criteria, or receipt of a message from a control plane.

14. The computer-implemented method of claim 11, wherein remapping the virtual device comprises copying a device state from the first device implementation to the second device implementation.

15. The computer-implemented method of claim 11, wherein a device monitor provides the second device implementation and pass-through access to the first device implementation.

16. The computer-implemented method of claim 11, further comprising:

requesting one or more memory addresses associated with the second device implementation from a device monitor, wherein remapping the virtual device to the second device implementation comprises remapping one or more memory addresses associated with the virtual device to the one or more memory addresses associated with the second device implementation.

17. The computer-implemented method of claim 11, wherein remapping the virtual device to the second device implementation comprises remapping interrupts to be routed to the virtual computing instance from an interrupt source associated with the second device implementation.

18. The computer-implemented method of claim 11, wherein remapping the virtual device to the second device implementation comprises mapping application programming interface (API) calls from the virtual computing instance to an API implementation associated with the second device implementation.

19. The computer-implemented method of claim 11, further comprising pausing execution of the virtual computing instance during the remapping.

20. The computer-implemented method of claim 11, wherein the virtual computing instance comprises a virtual machine.

21. A system, comprising:

one or more memories that include instructions; and one or more processors that are coupled to one or more memories and, when executing the instructions:

map a virtual device of a virtual computing instance to a first device implementation, the first device implementation and being one of an emulated device or a physical device, and in response to a trigger condition, remap the virtual device to a second device implementation, the second device implementation being the other of the emulated device or the physical device and wherein the remapping occurs without the virtual computing instance being aware of the remapping.

22. The system of claim 21, wherein the first device implementation comprises at least one of a physical or a software implementation, and the second device implementation comprises at least one of a physical or a software implementation.

23. The system of claim 21, wherein, the trigger condition comprises at least one of a migration of the virtual computing instance, a resource utilization of the first device implementation satisfying one or more criteria, or receipt of a message from a control plane.

24. The system of claim 21, wherein remapping the virtual device comprises copying a device state from the first device implementation to the second device implementation.

25. The system of claim 21, wherein a device monitor provides the second device implementation and pass-through access to the first device implementation.

26. The system of claim 21, wherein the one or more processors, when executing the instructions, further:

request one or more memory addresses associated with the second device implementation from a device monitor, wherein remapping the virtual device to the second device implementation comprises remapping one or more memory addresses associated with the virtual device to the one or more memory addresses associated with the second device implementation.

27. The system of claim 21, wherein remapping the virtual device to the second device implementation comprises remapping interrupts to be routed to the virtual computing instance from an interrupt source associated with the second device implementation.

28. The system of claim 21, wherein remapping the virtual device to the second device implementation comprises mapping application programming interface (API) calls from the virtual computing instance to an API implementation associated with the second device implementation.

29. The system of claim 21, wherein the one or more processors, when executing the instructions, further:

pause execution of the virtual computing instance during the remapping.

30. The system of claim 21, wherein the virtual computing instance comprises a virtual machine.

* * * * *